United States Patent
Takeuchi et al.

(10) Patent No.: US 10,836,251 B2
(45) Date of Patent: Nov. 17, 2020

(54) LID DEVICE

(71) Applicant: TOYODA GOSEI CO., LTD., Kiyosu (JP)

(72) Inventors: Maki Takeuchi, Kiyosu (JP); Masahiro Ogata, Kiyosu (JP); Takashi Hirano, Nagoya (JP)

(73) Assignee: TOYODA GOSEI CO., LTD., Aichi (JP)

( * ) Notice: Subject to any disclaimer, the term of this patent is extended or adjusted under 35 U.S.C. 154(b) by 65 days.

(21) Appl. No.: 16/248,947

(22) Filed: Jan. 16, 2019

(65) Prior Publication Data

US 2019/0232782 A1 Aug. 1, 2019

(30) Foreign Application Priority Data

Jan. 29, 2018 (JP) .................................. 2018-013093

(51) Int. Cl.
*B60K 15/05* (2006.01)
(52) U.S. Cl.
CPC ........ *B60K 15/05* (2013.01); *B60K 2015/053* (2013.01)
(58) Field of Classification Search
CPC .... B60K 2015/0561; B60K 2015/0538; B60K 2015/053; B60K 2015/0515; B60K 15/05; E05Y 2900/534; E05Y 2201/71; E05Y 2900/538; E05F 1/1207; E05F 1/1215; E05F 1/1238; B62D 25/24; B62D 25/10; B65D 2585/6882; B65D 2585/6875; B65D 2251/06; B65D 81/365
USPC ........ 220/DIG. 33, 827, 254.1, 254.3, 259.5; 292/22; 137/315.38; 49/149, 163, 166, 49/167, 236
See application file for complete search history.

(56) References Cited

U.S. PATENT DOCUMENTS

| 4,184,808 | A | * | 1/1980 | Cobb | ........................ F04C 2/14 417/348 |
| 5,065,884 | A | * | 11/1991 | Naritomi | ................ B65D 43/26 220/264 |
| 5,329,869 | A | * | 7/1994 | Freeman | ................. B63B 19/00 114/117 |
| 5,509,569 | A | * | 4/1996 | Hiranuma | .......... B60K 15/0406 220/746 |
| 5,893,478 | A | * | 4/1999 | Maruoka | ................... B60R 7/04 16/354 |

(Continued)

FOREIGN PATENT DOCUMENTS

JP H05-063944 U 8/1993

*Primary Examiner* — Kareen K Thomas
(74) *Attorney, Agent, or Firm* — Posz Law Group, PLC (57) ABSTRACT

A lid device includes an opening former, a lid, and a connector. The opening former is provided with an opening. The lid opens and closes the opening in the opening former. The connector intervenes between the opening former and the lid, and connects the opening former with the lid. The opening former includes a first gear. The lid includes a second gear. The connector includes a third gear meshing with both of the first gear and the second gear. The opening former and connector are made turnable relatively to one another about the axial center of the first gear. The lid and connector are made turnable relatively to one another about the axial center of the second gear. The connector interlocks the opening former turning relatively to the connector and the lid turning relatively to the connector with one another.

10 Claims, 6 Drawing Sheets

(56) References Cited

U.S. PATENT DOCUMENTS

| | | | | |
|---|---|---|---|---|
| 6,009,920 A | * | 1/2000 | Palvoelgyi | B60K 15/03519 137/588 |
| 2008/0296912 A1 | * | 12/2008 | Whitner | E05B 47/0012 292/144 |
| 2015/0257580 A1 | * | 9/2015 | Crarer | B65D 65/466 426/425 |
| 2020/0157859 A1 | * | 5/2020 | Szente | B60R 21/38 |

* cited by examiner

LID DEVICE

INCORPORATION BY REFERENCE

The present invention is based on Japanese Patent Application No. 2018-013093, filed on Jan. 29, 2018, the entire contents of which are incorporated herein by reference.

BACKGROUND OF THE INVENTION

1. Field of the Invention

The present invention relates to a lid device to be fit in a filler neck or a charging port, for instance.

2. Description of the Related Art

Japanese Unexamined Utility Model Publication (KOKAI) Gazette No. 5-63944, for instance, discloses a conventionally-known lid device for opening and closing a filler neck, or the like, with which a panel or housing, and so forth, is provided. As disclosed in the publication, the conventionally-known lid device comprises an opening former, a lid, and a link. The opening former includes an opening communicating with a filler neck. The link formed in a substantially-squared punched-out shape includes first and second link tabs opposing parallel to one another. The first link tab is attached pivotalLy to a first bearing arranged at the circumferential rim of the opening in the opening former. The second link tab is attached pivotally to a second bearing arranged in the lid. Moreover, the conventionally-known lid device further comprises a plate-shaped spring installed between the lid and the opening former. The plate-shaped spring generates an urging force for urging the lid in the outward direction relative to the opening former.

The plate-shaped spring acts on the link to turn it about the first link tab when a user or operator carries out an unlocking manipulation in order to release the conventionally-known lid device from the locked state where the lid maintains the opening in the opening former under the closed condition. As a result, the lid moves parallel to the opening former to a more outward side than a side where the outer face of the opening former is present. Then, he or she manually manipulates the lid to turn it about the second link tab in the opening direction. Thus, the opening in the opening former opens with a large magnitude of opening.

SUMMARY OF THE INVENTION

However, the above conventionally-known lid device disclosed in the publication involves a process in which the lid shifts from the fully-closed position to the fully-opened position. During the process, the lid first moves outward parallel to the opening former, and thereafter it turns in the opening direction. Accordingly, while the process enables the lid to open to a large magnitude of opening, the lid has come to carry out the opening operation in two actions. Moreover, in the other process in which the lid shifts from the fully-opened position to the fully-closed position, the lid likewise performs two actions, namely, the turning in the closing direction and the inward moving parallel to the opening former, independently of one another. Consequently, the two actions might potentially impair the lid to smoothly open and close the opening in the opening former.

The present invention has been developed in view of the circumstances as described above. It is therefore an object of the present invention to provide a lid device that allows ensuring its lid smooth opening and closing operations.

For example, a lid device according to the present invention comprises:

an opening former provided with an opening;

a lid opening and closing the opening in the opening former; and a connector intervening between the opening former and the lid, and connecting the opening former with the lid;

the opening former including a first gear which is provided with external teeth on an arc face thereof;

the lid including a second gear which is provided with external teeth on an arc face thereof;

the connector including a third gear which is provided with external teeth on an arc face thereof, and which meshes with both of the first gear and the second gear;

the opening former and connector made turnable relatively to one another about an axial center of the first gear;

the lid and connector made turnable relatively to one another about an axial center of the second gear;

the connector interlocking the opening former, which turns relatively to the connector, and the lid, which turns relatively to the connector, with one another.

The thus constructed lid device according to the present invention not only enables the lid to open and close between a fully-closed position and a fully-opened position relative to the opening former, but also enables the lid to perform each of the opening and closing operations in a single action through the first, second and third gears meshing with each other while ensuring the lid a large magnitude of opening at the fully-opened position, because the present lid device comprises the connector interlocking the opening former, which turns relatively to the connector about the axial center of the first gear, and the lid, which turns relatively to the connector about the axial center of the second gear, with one another. Consequently, the present lid device allows ensuring the lid smooth actions during both of the opening and closing operations, namely, the opening operation from the fully-closed position to the fully-opened position and the closing operation from the fully-opened position to the fully-closed position.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Figure 1:
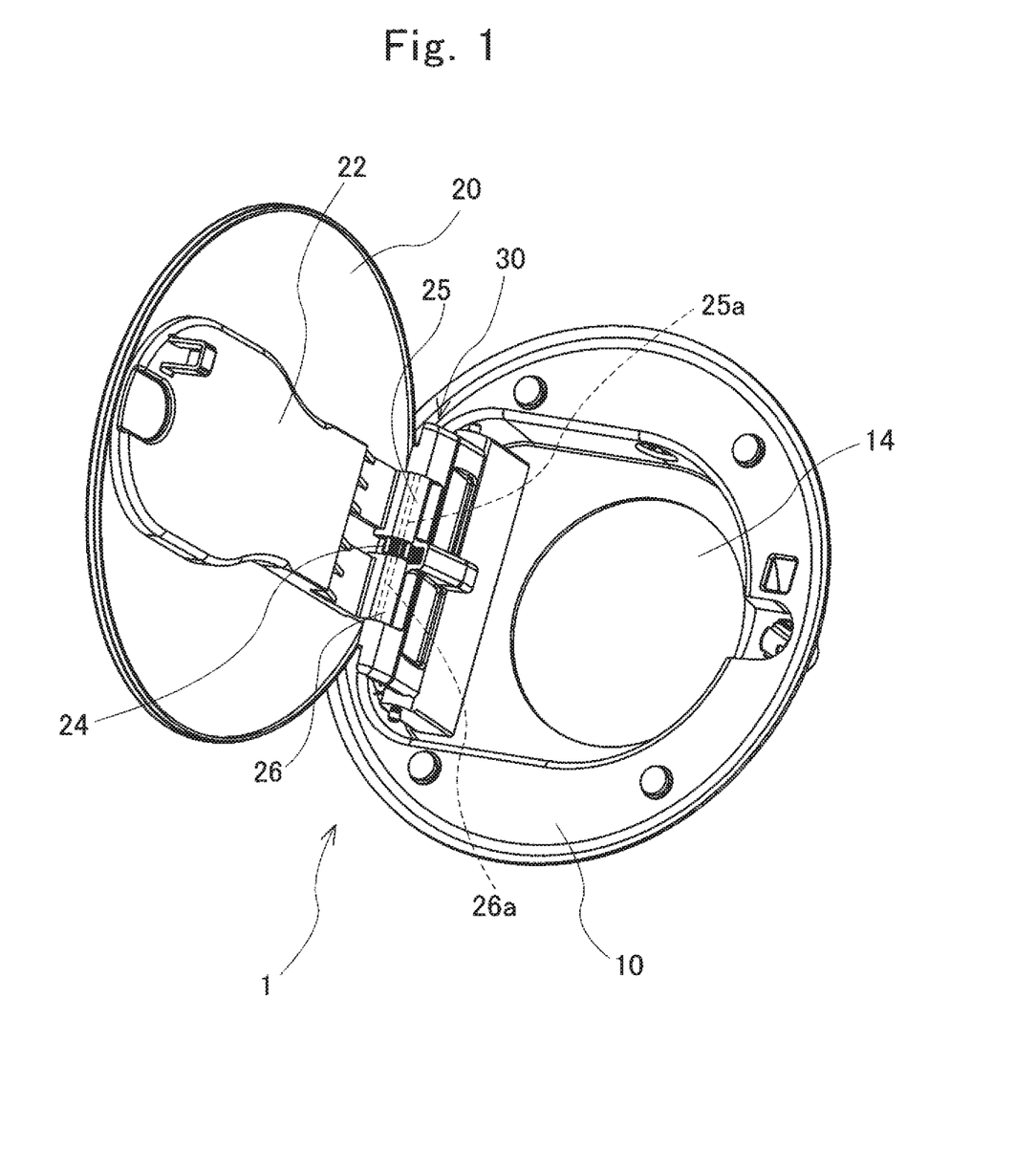
FIG. 1 is a perspective view illustrating a lid device according to Embodiment of the present invention when being opened.

Hereinafter, a specific embodiment mode of a lid device according to the present invention will be described using the drawings. A present lid device 1 according to Embodiment is a device for opening and closing a vehicular filler neck or charging port, and the like, for instance. As illustrated in FIG. 1, the present lid device 1 comprises an opening former 10, a lid 20, and a connector 30.

Figure 2:
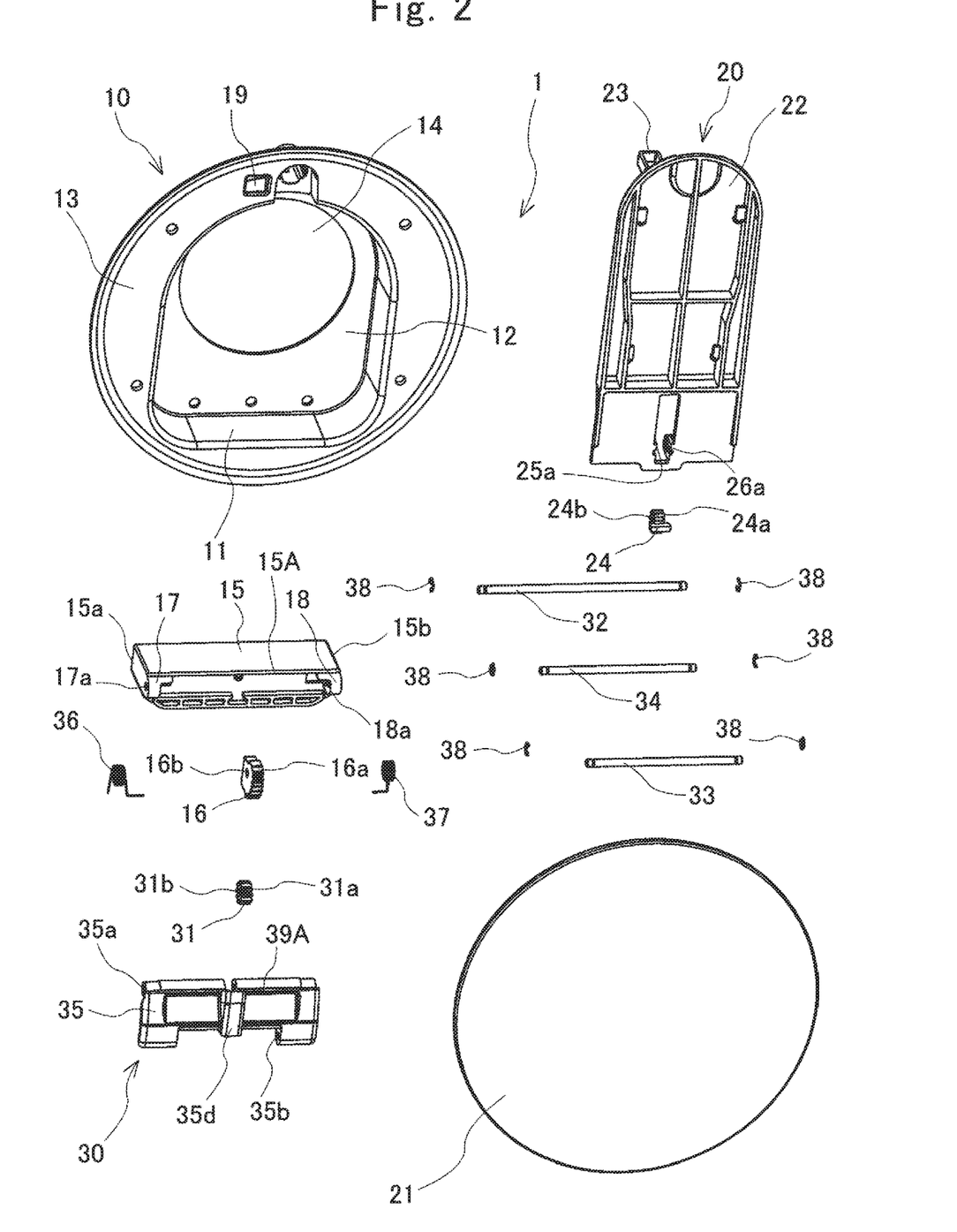
FIG. 2 is an exploded perspective view of the present lid device according to Embodiment.

The opening former 10 is a member formed in a shape of holder substantially. The opening former 10 is made of an injection-molded body formed of resin, for instance. The opening former 10 is fit in an installation bore with which a vehicular body panel is provided, for instance. As illustrated in FIG. 2, the opening former 10 includes a cylinder 11 formed in a shape of cylinder substantially, a bottom wall 12 extending from the inner end of the cylinder 11 to the diametrically inner side, and a flange 13 extending from the outer end of the cylinder 11 to the diametrically outer side. The flange 13, which is formed in a substantially annular shape, is attached to the circumferential rim of the installation bore in the vehicular panel. The bottom wall 12 is provided with a circularly-shaped opening 14. The opening 14 makes a port serving as a filler neck or charging port in which one of the opposite ends of piping or cable connected with a fuel tank or battery is arranged.

The opening former 10 further includes a supporter 15. The supporter 15 is a member formed in a shape of box. The supporter 15 is installed fixedly onto the bottom wall 12 and cylinder 11. The supporter 15 includes a gear 16. The gear 16 is made of a spur gear formed in a shape of disk. The gear 16 is nonrotatable relative to the supporter 15, because it is fixed on the front-face side of the supporter 15, namely, one of the opposite sides across from the bottom wall 12 of the opening former 10. The gear 16 is provided with a plurality of outer teeth 16a protruding outwardly on the outer peripheral face making an arc face. The multiple outer teeth 16a, which line up in the peripheral direction, are formed on the outer face of the gear 16 partially. The outer teeth 16a of the gear 16 have a predetermined outside diameter. Moreover, the gear 16 has a predetermined thickness axially. In addition, the gear 16 is provided with an axial bore 16b at the axial center being the arc center as well.

The supporter 15 further includes side walls (15a, 15b) which are provided with protuberances (17, 18). Each of the protuberances (17, 18) is a site protruding from the side of the bottom wall 12 of the opening former 10 toward the front-face side. The protuberances (17, 18) are arranged so as to put or hold the gear 16 at the middle between them. The protuberances (17, 18) are provided with axial bores (17a, 18a), respectively. Each of the axial bores (17a, 18a) is bored coaxially with the axial center of the gear 16, namely, with the axial bore 16b.

The lid 20 is a member opening and closing the opening 14 in the opening former 10. The lid 20 is made of an injection-molded body formed of resin, for instance. The lid 20 includes a lid body 21, and a supportive body 22. The lid body 21 is formed in a shape of circle substantially so as to fit into the configuration that the flange 13 of the opening former 10 has. The supportive body 22 is attached onto the rear face of the lid body 21. The supportive body 22 has a function of enhancing the lid body 21 in the strength.

The supportive body 22 is provided with an engagement projection 23. The flange 13 of the opening former 10 is provided with an engagement bore 19 into which the engagement projection 23 is inserted. The engagement projection 23, which is inserted into the engagement bore 19 when the lid 20 is at the fully-closed position, leads to hooking between claws of the engagement projection 23 and engagement bore 19. As a result, the hooking keeps the lid 20 engaging with the opening former 10 at the fully-closed position. The engagement projection 23 of the lid 20, and the engagement bore 19 of the opening former 10 constitute a locking mechanism in the present lid device 1 according to Embodiment. The locking mechanism locks the lid 20 under the closed condition through the hooking between the claws of the engagement projection 23 and engagement bore 19. However, a user or operator cancels the locking by a predetermined unlocking manipulation that releases the hooking between the claws.

The lid 20 further includes a gear 24. The gear 24 is made of a spur gear formed in a shape of disk. The gear 24 is nonrotatable relative to the supportive body 22, because it is fixed on the rear-face side of the supportive body 22. The gear 24 is provided with a plurality of outer teeth 24a protruding outwardly on the outer peripheral face making an arc face. The multiple outer teeth 24a, which line up in the peripheral direction, are formed partially on the outer face of the gear 24, specifically, partially on the outer face across from the side of the opening former 10. The outer teeth 24a of the gear 24 have a predetermined outside diameter. Moreover, the gear 24 has a predetermined thickness axially. In addition, the gear 24 is provided with an axial bore 24b at the axial center being the arc center as well.

The supportive body 22 is provided with protuberances (25, 26) as shown in FIG. 1. Each of the protuberances (25, 26) is a site protruding from the front-face side, which makes the side across from the lid body 21, toward the side where the opening former 21 is present. The protuberances (25, 26) are arranged so as to put or hold the gear 24 at the middle between them. As illustrated in FIG. 2, the protuberances (25, 26) are provided with axial bores (25a, 26a), respectively. Each of the axial bores (25a, 26a) is bored coaxially with the axial center of the gear 24, namely, with the axial bore 24b.

The connector 30, which intervenes between the opening former 10 and the lid 20 as shown in FIG. 1, is a member connecting the opening former 10 with the lid 20. The connector 30 includes a mechanism for actuating the lid 20 to open and close relative to the opening former 10. As illustrated in FIG. 2, the connector 30 includes a gear 31, three shafts (32, 33, 34), a base member 35, and two springs (36, 37). The connector 30 is made of injection-molded bodies, specifically, the gear 31 and base member 35 formed of resin, for instance.

The gear 31 is made of a spur gear formed in a shape of disk. The gear 31 is provided with a plurality of outer teeth 31a protruding outwardly on the outer peripheral face making an arc face. The multiple outer teeth 31a, which line up in the peripheral direction of the gear 31, are formed on the outer face of the gear 31 over the entire periphery. The gear 31 intervenes between the gear 16 of the opening former 10 and the gear 24 of the lid 20. The gear 31, which meshes with both of the gears (16, 24), is not only turnable relative to the gear 16 but also turnable relative to the gear 24. The outer teeth 31a of the gear 31 have a predetermined outside diameter. Moreover, the gear 31 has a predetermined thickness axially. In addition, the gear 31 is provided with an axial bore 31b at the axial center being the arc center as well.

Figure 6:
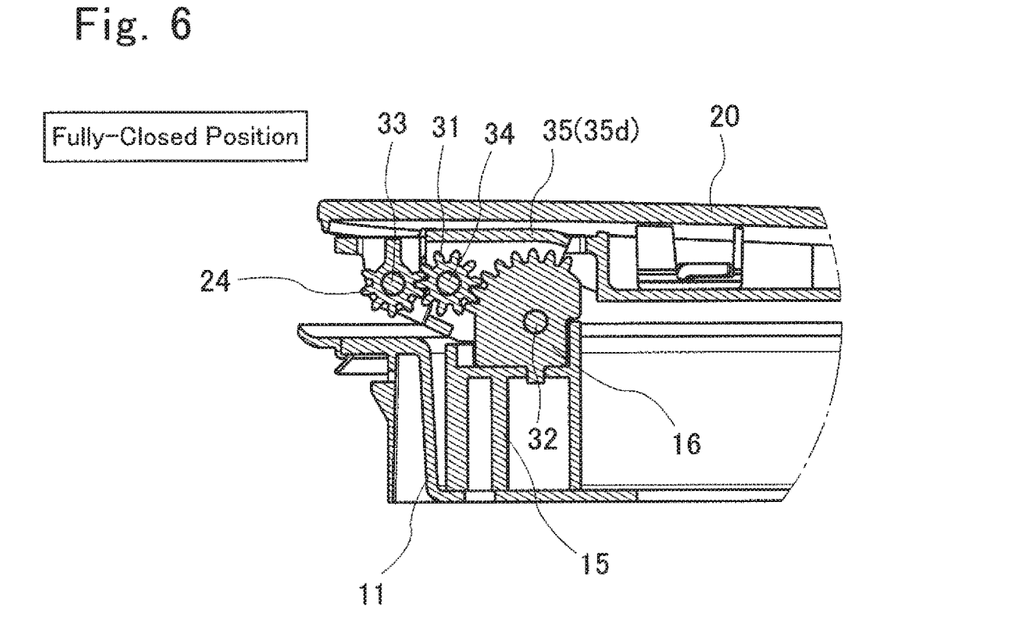
FIG. 6 is a schematic diagram illustrating gears with which the present lid device according to Embodiment is equipped, and how the gears are meshed with each other when the lid is placed at the fully-closed position.
Figure 7:
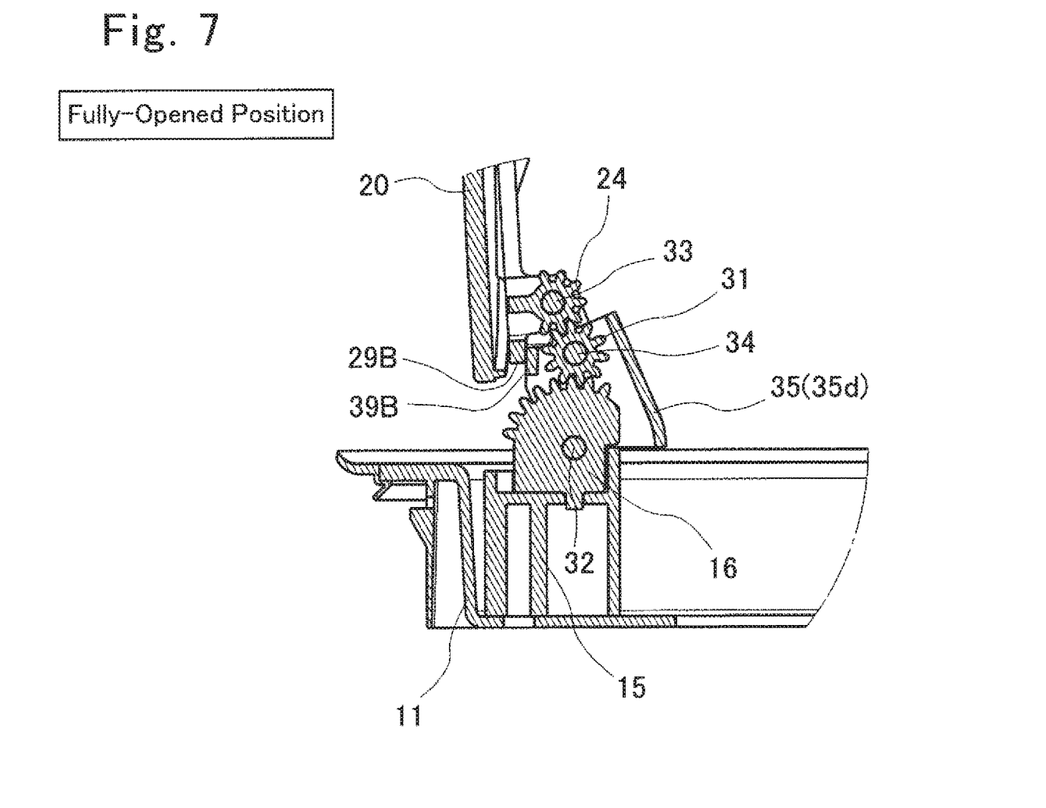
FIG. 7 is a schematic diagram illustrating gears with which the present lid device according to Embodiment is equipped, and how the gears are meshed with each other when the lid is placed at the fully-opened position.

The base member 35 is formed in a shape of plate substantially. The base member 35 is provided with a cover element 35d. The cover element 35d makes a site enclosing to cover or accommodate meshes between the gear 31 and its mating gears, specifically, the mesh between the gear 31 and the gear 16 and the mesh between the gear 31 and the gear 24. The cover element 35d is arranged so as to neighbor the supporter 15 of the opening former 10 on the front-face side of the supporter 15 while providing a clearance for covering or accommodating the meshes between the gear 31 and the mating gears (16, 24), as shown in FIG. 6, when the lid 20 is at the fully-closed position, and so as to cover or accommodate the meshes between the gear 31 and the mating gears (16, 24) on the rear-face side of the lid 20 while putting or holding the meshes between itself and the lid 20, as shown in FIG. 7, when the lid 20 is at the fully-opened position.

Figure 3:
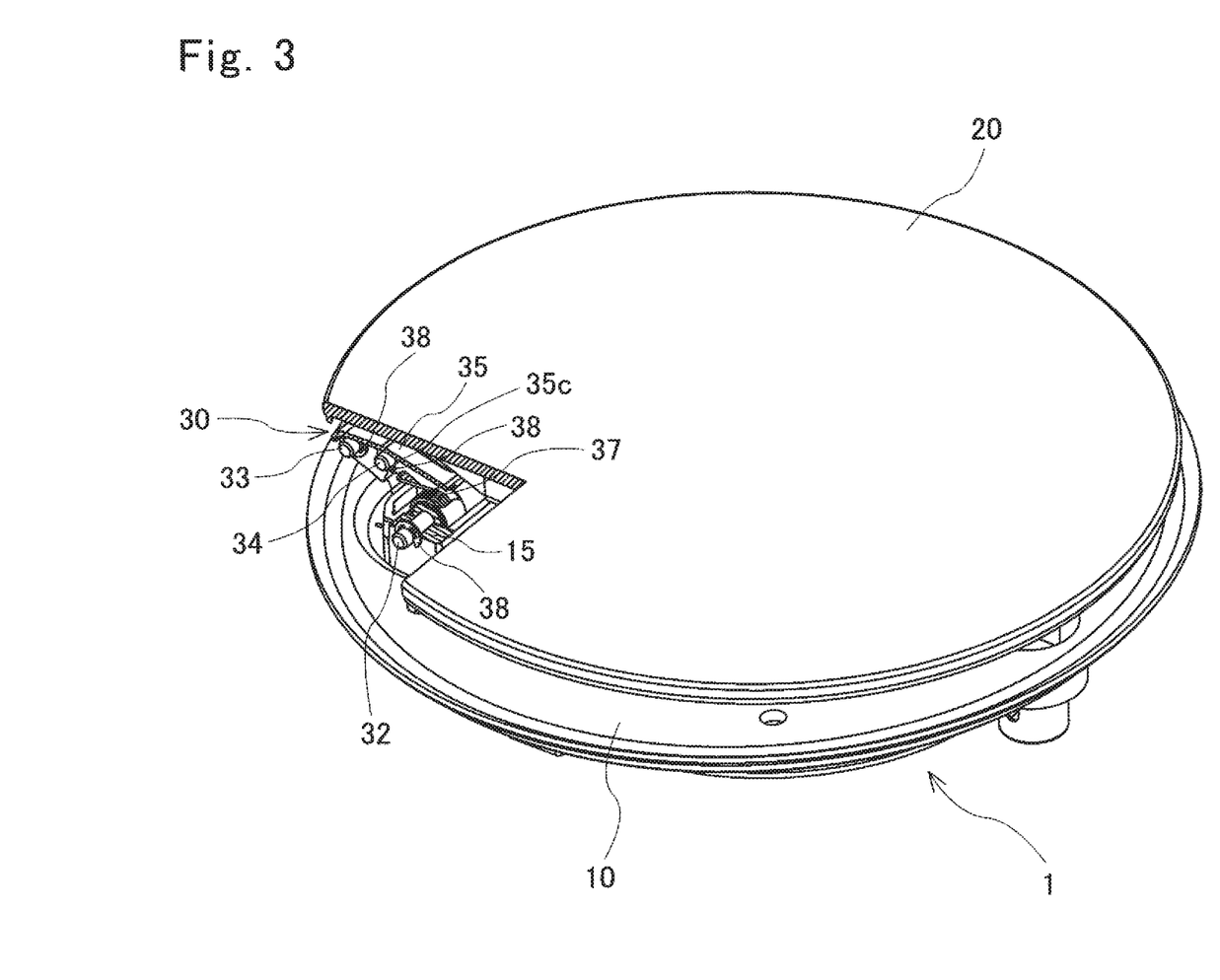
FIG. 3 is a perspective view illustrating the present lid device according to Embodiment comprising an urging member which appears specifically when the lid is cut out partially, and how the urging member is assembled.

As illustrated in FIG. 2, each of the three shafts (32, 33, 34), which are formed circularly in the cross section, is made of a shaft-shaped member elongating like a rod or linearly. The base member 35 is provided with insertion bores (35a, 35b, 35c) as shown in FIGS. 2 and 3. The insertion bores (35a, 35b, 35c) are arranged so as to line up parallel to each other. The shafts (32, 33, 34) are inserted into the insertion bores (35a, 35b, 35c), respectively. The shafts (32, 33, 34) line up parallel to each other under the condition that they are inserted into the insertion bores (35a, 35b, 35c). Moreover, the shafts (32, 33, 34) are arranged so as to sustain a predetermined positional relationship to each other when they are viewed axially, regardless of any positions at which the opening and closing lid 20 is present.

The shaft 34 is inserted into the axial bore 31b of the gear 31 while being inserted into the insertion bore 35c in the base member 35 of the connector 30. The base member 35 thus supports the shaft 34. Note that the shaft 34 and gear 31 are also satisfactorily made rotatable relative to the base member 35, but are even adequately fixed to the base member 35 nonrotatably.

The shaft 32 is inserted into the axial bore 16b in the gear 16 of the supporter 15 of the opening former 10 while being inserted into the insertion bore 35a in the base member 35 of the connector 30, and is further inserted into the axial bores (17a, 18a) in the side walls (15a, 15b) of the supporter 15. The opening former 10 thus supports the shaft 32. Note that the shaft 32 is also satisfactorily made rotatable relative to the opening former 10 and base member 35, but is even adequately fixed to either one of the opening former 10 and base member 35 nonrotatably. Moreover, the opening former 10, and the base member 35 of the connector 35 are made turnable or swingable relatively to one another about the axial center of the gear 16 and shaft 32.

The shaft 33 is inserted into the axial bore 24b in the gear 24 of the lid 20 while being inserted into the insertion bore 35b in the base member 35 of the connector 30, and is further inserted into the axial bores (25a, 26a) in the protuberances (25, 26) of the lid 20. The lid 20 thus supports the shaft 33. Note that the shaft 33 is also satisfactorily made rotatable relative to the lid 20 and base member 35, but is even adequately fixed to either one of the lid 20 and base member 35 nonrotatably. Moreover, the lid 20, and the base member 35 of the connector 35 are made turnable or swingable relatively to one another about the axial center of the gear 24 and shaft 33. In addition, paired fasteners (38, 38) shown in FIG. 2 retain the shafts (32, 33, 34) respectively, inhibiting them from axially coming off from their mating members as shown in FIG. 3.

Each of the two springs (36, 37) makes an urging member that generates a force for urging the lid 20 in the opening direction in which it opens the opening 14 in the opening former 10. The paired springs (36, 37) are arranged symmetrically on the opposite sides of the base member 35. The springs (36, 37) are further arranged at the opposite ends of the shaft 32 so as to cover or accommodate the opposite ends. As illustrated in FIG. 3, each of the springs (36, 37) is installed between the supporter 15 of the opening former 10 and the base member 35 of the connector 30. Each of the springs (36, 37) is made of a torsional coiled spring one of whose opposite ends is fixed to the supporter 15 of the opening former 10, and another of whose opposite ends is fixed to the base member 35 of the connector 30. The springs (36, 37) exhibit the maximum urging force when the lid 20 is present at the fully-closed position, and exhibit the minimum urging force when the lid 20 is present at the fully-opened position. Note that the locking mechanism, which locks the lid 20 under the fully-closed condition, allows maintaining the locking even when the springs (36, 37) exert urging forces to the lid 20.

As illustrated in FIG. 2, the base member 35 includes a stopper element 39A inhibiting the lid 20 from opening more than a predetermined magnitude of opening. The stopper 39A protrudes from the base member 35 so as to come in contact with a contact element 15A on the support 15 of the opening former 10 when the lid 20 opens to achieve the predetermined magnitude of opening. Note that the stopper element 39A desirably comes in contact with the contact element 15A on the supporter 15 face-to-face at multiple points or areally. Thus, the stopper element 39A on the base member 35 of the connector 30, and the contact element 15A on the supporter 15 of the opening former 10 constitute a stopper mechanism inhibiting the lid 20 from opening more than the predetermined degree of opening.

Figure 8:
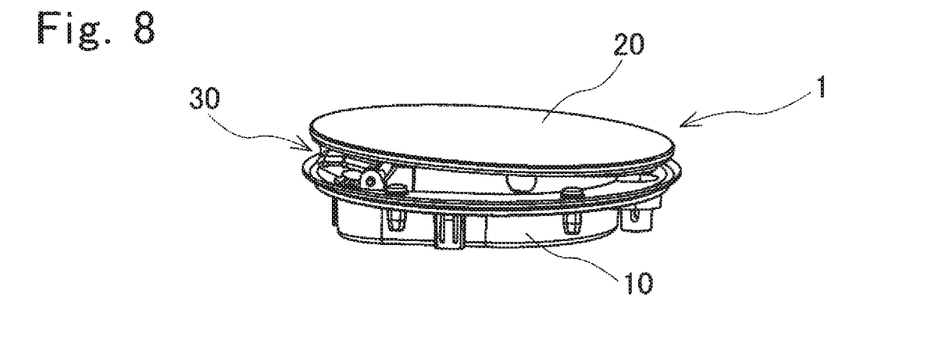
FIG. 8 is a perspective view illustrating the present lid device according to Embodiment with the lid placed at the fully-closed position.

As illustrated in FIG. 2, the present lid device 1 according to Embodiment comprises the opening former 10 including the engagement bore 19, and the lid 20 including the engagement projection 23 inserted into the engagement bore 19. The engagement bore 19 and engagement projection 23, whose claws engage with one another when the lid 20 is present at the fully-closed position to close the opening 14 in the opening former 10, lock the lid 20 under the fully-closed condition against the urging forces, which the springs (36, 37) of the connector 30 exert to the lid 20. Under the circumstances, the base member 35 of the connector 30 assumes such a position as shown in FIGS. 3, 6 and 8 so that it is parallel to the front face of the opening former 10 on the front-face side and is parallel to the rear face of the lid 20 on the rear-face side.

A user or operator cancels the hooking between the claws of the engagement projection 23 and engagement bore 19 by carrying out a predetermined unlocking manipulation for freeing the lid 20 from the fully-closed condition. When the hooking between the claws is canceled, the springs (36, 37) give the base member 35 of the connector 30 urging forces that turn or swing the base member 35 about the shaft 32 relative to the supporter 15 of the opening former 10.

Figure 4:
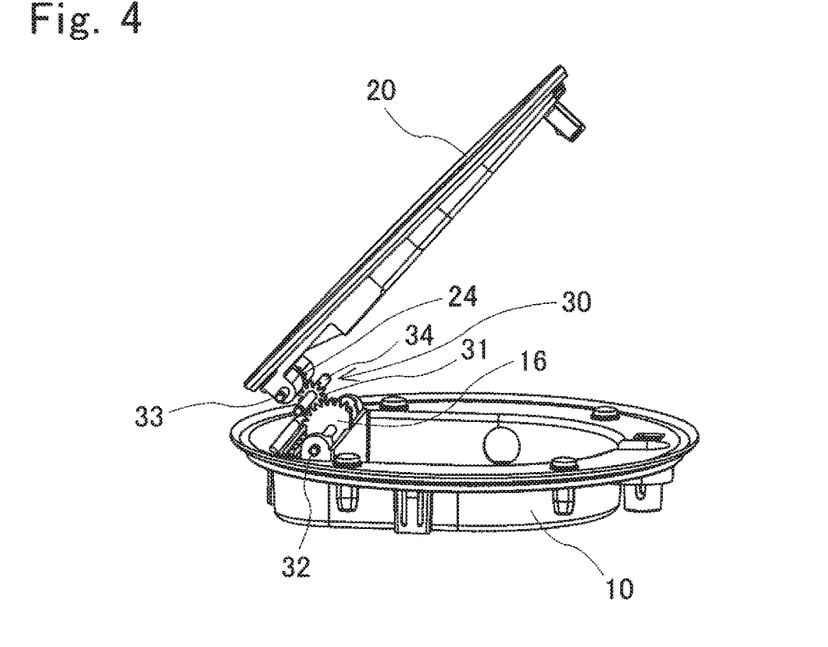
FIG. 4 is a perspective view illustrating the present lid device according to Embodiment with the lid placed at the half-opened position wherein the present lid device appears specifically when a base member protecting gears is removed.

The urging forces, which the springs (36, 37) give to the base member 35, turn or swing the gear 31 of the base member 35 on the outer periphery of the gear 16 fixed to the supporter 15 of the opening former 10 while meshing with the gear 16, as shown in FIG. 4. The gear 31 turns or swings relative to the gear 16 so that it revolves in one of the opposite directions, namely, in the clockwise direction in FIGS. 6 and 7, relative to the axial center of the gear 16. On this occasion, the gear 31 rotates about its own axial center in one of the opposite directions, namely, in the clockwise direction in the drawings.

As described above, the shafts (32, 33, 34) are arranged so that they sustain a predetermined relative positional relationship when viewed axially, regardless of any positions at which the opening and closing lid 20 is present. Accordingly, the gears (15, 24, 31) also sustain a predetermined relative positional relationship when viewed axially, regardless of any positions at which the opening and closing lid 20 is present. Consequently, the gear 24 fixed to the supportive body 22 of the lid 20 turns or swings on the outer periphery of the gear 31, which turns or swings on the outer periphery of the gear 16 as described above, while meshing with the gear 31, during which the turning or swinging gear 24 synchronously interlocks with the turning or swinging gear 31 so as to sustain the predetermined positional relationship. Moreover, the gear 24 turns or swings relative to the gear 31 so that it revolves in one of the opposite directions, namely, in the clockwise direction in FIGS. 6 and 7, relative to the axial center of the gear 16. On this occasion, the gear 24 rotates about its own axial center in another one of the opposite directions, namely, in the counterclockwise direction in the drawings.

Figure 9:
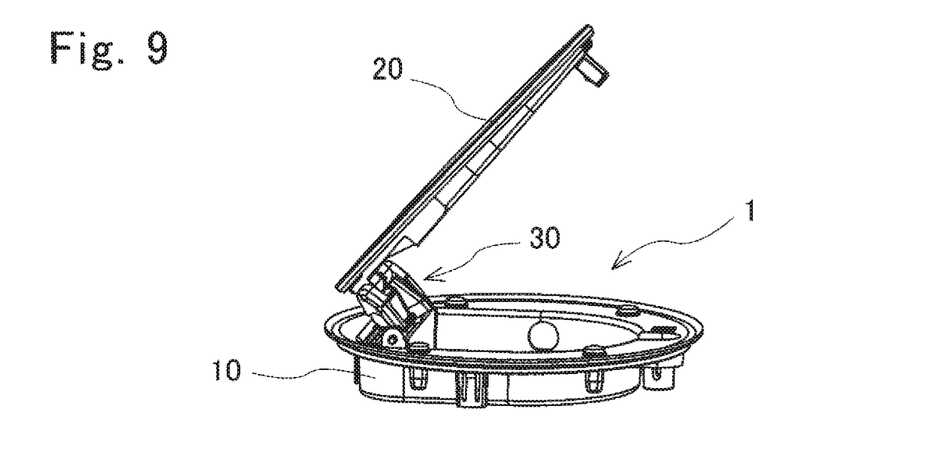
FIG. 9 is a perspective view illustrating the present lid device according to Embodiment with the lid placed at the half-opened position.
Figure 10:
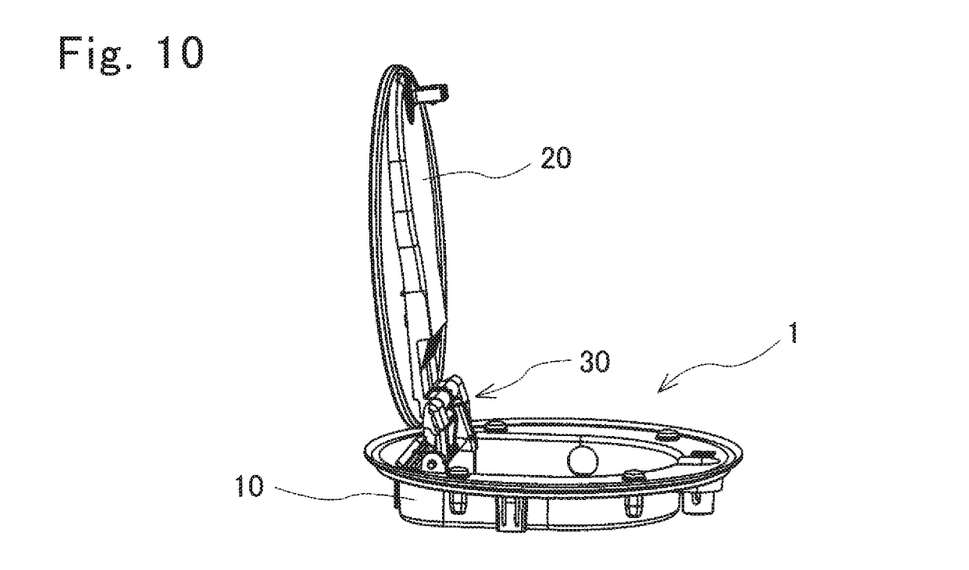
FIG. 10 is a perspective view illustrating the present lid device according to Embodiment with the lid placed at the fully-opened position.

The gear 31, which rotates in the one of the opposite peripheral directions (i.e., in the clockwise direction in FIGS. 6 and 7) while revolving in the one of the opposite peripheral directions (i.e., in the clockwise direction in the drawings) relative to the gear 16, inclines the base member 35 from the posture parallel to the opening former 10. Then, the gear 31 turns or swings the base member 35 about the axial center of the gear 16 and shaft 32 so as to make larger its inclination angle to the surface of the opening former 10, as shown in FIGS. 8, 9 and 10. Under the circumstances, the base member 35 inclines toward one of the opposite sides with respect to the surface of the opening former 10. Moreover, the gear 24, which rotates in the other one of the opposite peripheral directions (i.e., in the counterclockwise direction in FIGS. 6 and 7) while revolving in the one of the opposite peripheral directions (i.e., in the clockwise direction in the drawings) relative to the gear 16, inclines the lid 20 relative to the base member 35. Then, the gear 24 turns or swings the lid 20 about the axial center of the gear 24 and shaft 33 so as to make larger its inclination angle to the surface of the opening former 10. Under the circumstances, the lid 20 inclines toward the other one of the opposite sides with respect to the surface of the opening former 10.

Figure 5:
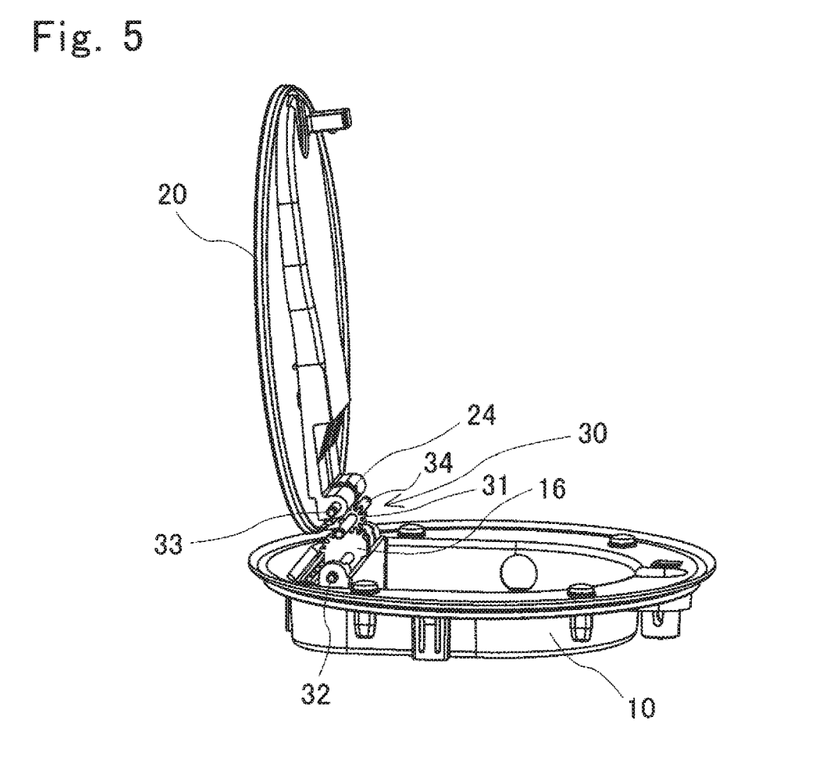
FIG. 5 is a perspective view illustrating the present lid device according to Embodiment with the lid placed at the fully-opened position wherein the present lid device appears specifically when a base member protecting gears is removed.

The springs (36, 37) give their urging forces to the base member 35 until the lid 20 achieves a predetermined magnitude of opening. Consequently, the urging forces, which the springs (36, 37) exert, turn or swing the lid 20, to which a user or operator has been carried out a predetermined unlocking manipulation to free it from the fully-closed condition, to the fully-opened position relative to the opening former 10, as shown in FIGS. 5, 7 and 10. The fully-opened lid 20, and the base member 35 are put in such attitudinal conditions as the base member 35 stands upright orthogonally to the front face of the opening former 10 on the front-face side as well as the rear faces of both of the lid 20 and base member 35 become parallel to one another on the rear-face side of the lid 20.

In contrast, when a user or operator carries out a closing manipulation to the fully-opened lid 20 in the present lid device 1 according to Embodiment against the urging forces that the springs (36, 37) exert, he or she exerts a manipulative force to the gear 24, which is fixed to the supportive body 22 of the lid 20, to turn or swing it on the outer periphery of the gear 31 on the base member 35 of the connector 30 while meshing with the gear 31. The gear 24 turns or swings relative to the axial center of the gear 31 so as to revolve in the other one of the opposite directions, namely, in the counterclockwise direction in FIGS. 6 and 7. On this occasion, the gear 24 rotates about its own axial center in the one of the opposite directions, namely, in the clockwise direction in the drawings.

As described above, the gears (16, 24, 31) are arranged so that they sustain a predetermined relative positional relationship when viewed axially, regardless of any positions at which the opening and closing lid 20 is present, in the same manner as the shafts (32, 33, 34) do. Consequently, the gear 24, which turns or swings on the outer periphery of the gear 31 as described above, turns or swings the gear 31 on the outer periphery of the gear 16 fixed to the supporter 15 of the opening former 10 while meshing with the gear 16, during which the turning or swinging gear 31 synchronously interlocks with the turning or swinging gear 24 so as to sustain the predetermined positional relationship. The gear 31 turns or swings relative to the gear 16 so that it revolves in the other one of the opposite directions, namely, in the counterclockwise direction in FIGS. 6 and 7, relative to the axial center of the gear 16. On this occasion, the gear 31 rotates about its own axial center in the other one of the opposite directions, namely, in the counterclockwise direction in the drawings.

The gear 24, which rotates in the one of the opposite peripheral directions (i.e., in the clockwise direction in FIGS. 6 and 7) while revolving in the other one of the opposite peripheral directions (i.e., in the counterclockwise direction in the drawings) relative to the gear 16, turns or swings the lid 20 inclined to the base member 35 so as to make smaller its inclination angle to the front face of the opening former 10. Thus, the lid 20 eventually becomes parallel to the opening former 10 so as to close the opening 14. Moreover, the gear 31, which rotates in the other one of the opposite peripheral directions (i.e., in the counterclockwise direction in the drawings) while revolving in the other one of the opposite peripheral directions (i.e., in the counterclockwise direction in the drawings) relative to the gear 16, turns or swings the base member 35 so as to make smaller its inclination angle to the front face of the opening former 10. Thus, the base member 35 eventually becomes parallel to the front face of the opening former 10.

Consequently, the present lid device 1 according to Embodiment enables the lid 20 to turn or swing to the fully-closed position relative to the opening former 10 against the urging forces that the springs (36, 37) exert when a user or operator carries out the closing manipulation to the fully-opened lid 20. The lid 20, which has turned or swung to the fully-closed position, includes the engagement projection 23 inserted into the engagement bore 19 in the opening former 10 to result in the engagement between their claws. The claws, which engage with one another, lock the lid 20 under the fully-closed condition. The present lid device 1 with the fully-closed lid 20 comprises the base member 35 that is put under an attitudinal condition where it not only becomes parallel to the front face of the opening former 10 on the front-face side but also becomes parallel to the rear face of the lid 20 on the rear-face side.

The thus constructed present lid device 1 according to Embodiment allows synchronously interlocking the opening former 10 and base member 35, which turn or swing relatively to one another, and the lid 20 and base member 35, which turn or swing relatively to one another, with each other, because the present lid device 1 comprises: the gear 16 with which the opening former 10 is provided; the gear 31 with which the connector 30 is provided and which turns or swings on the outer periphery of the gear 16; and the gear 24 with which the lid 20 is provided and which turns or swings on the outer periphery of the gear 31; wherein the turning or swinging gear 30 and the turning or swinging gear 24 interlock with each other synchronously.

That is, the gear 31 of the connector 30 turns or swings on the outer periphery of the gear 16 of the opening former 10 in the direction of opening the lid 20 in the process where the lid 20 shifts from the fully-closed position to the fully-opened position. Accordingly, the gear 31 turns or swings the base member 35 of the connector 30 from the parallel posture to the upright posture relative to the opening former 10. On this occasion, the site connecting the lid 20 with the connector 30 (i.e., the position at which the gear 24 and shaft 33 are present) moves outward relative to the front face of the opening former 10. Consequently, the entire lid 20 moves outward relative to the front face of the opening former 10. Moreover, the lid 20 includes the gear 24 that turns or swings on the outer periphery of the turning or swinging gear 31 of the connector 30 while synchronously interlocking with the gear 31. Accordingly, the lid 20 turns or swings in the opening direction relative to the base member 35. Consequently, the base member 35 turning or swinging relative to the opening former 10, and the lid 20 turning or swinging relative to the base member 35 interlock with one another synchronously. Therefore, the present lid device 1 according to Embodiment simultaneously performs the outward movement of the lid 20 relative to the opening former 10, and the opening-direction turn or swing of the lid 20 relative to the opening former 10 synchronously with one another.

In contrast, the gear 31 of the connector 30 turns or swings on the outer periphery of the gear 16 of the opening former 10 in the direction of closing the lid 20 in the process where the lid 20 shifts from the fully-opened position to the fully-closed position. Accordingly, the gear 31 turns or swings the base member 35 of the connector 30 from the upright posture to the parallel posture relative to the opening former 10. On this occasion, the site connecting the lid 20 with the connector 30 moves inward relative to the front face of the opening former 10. Consequently, the entire lid 20 moves inward relative to the front face of the opening former 10. Moreover, the gear 24 of the lid 20 turns or swings on the outer periphery of the turning or swinging gear 31 of the connector 30 in the opposite direction to the above-described direction while interlocking with the turning or swinging gear 31 synchronously. Accordingly, the lid 20 turns or swings in the closing direction relative to the base member 35. Consequently, the base member 35 turning or swinging relative to the opening former 10, and the lid 20 turning or swinging relative to the base member 35 interlock with one another synchronously. Therefore, the present lid device 1 according to Embodiment simultaneously performs the inward movement of the lid 20 relative to the opening former 10, and the closing-direction turn or swing of the lid 20 relative to the opening former 10 synchronously with one another.

Thus, the present lid device 1 according to Embodiment not only allows operating the lid 20 to open and close between the fully-closed position and the fully-opened position relative to the opening former 10, but also permits the lid 20 to perform each of the opening and closing operations in a single action through the meshes between the three gears (16, 24, 31) while ensuring that the lid 20 opens to the largest magnitude of opening at the fully-opened position. Hence, the present lid device 1 allows ensuring the lid 20 a smooth operation for both of the opening action from the fully-closed position to the fully-opened position and the closing action from the fully-opened position to the fully-closed position.

Moreover, the present lid device 1 according to Embodiment permits keeping the fully-opened lid 20 from accidentally falling forward in the closing direction, because the mesh between the gear 16 and the gear 31 and the mesh between the gear 24 and the gear 31 produce friction resistances between the teeth during the opening and closing operations of the lid 20.

In addition, the present lid device 1 according to Embodiment comprises the springs (36, 37) installed between the opening former 10 and the connector 30. The springs (36, 37) generate urging forces for urging the lid 20 in the opening direction. In other words, the present lid device 1 comprises an urging member generating an urging force for urging the lid 20 in the opening direction.

The thus constructed lid device 1 according to Embodiment comprises the springs (36, 37) exerting urging forces to the fully-closed lid 20 to make it perform the opening operation from the fully-closed position to the fully-opened position when a user or operator carries out a predetermined unlocking manipulation. That is, the urging forces resulting from the springs (36, 37) act on the lid 20 in performing the opening operation from the fully-closed position to the fully-opened position. Accordingly, it is unnecessary for the user or operator to manually open the lid 20 to the fully-opened position in manipulating the opening operation from the fully-closed position to the fully-opened position. Consequently, the springs (36, 37) not only allow simplifying the opening operation of the lid 20, but also permit making it unnecessary for the user or operator to touch the lid 20 in order to open it. Moreover, the springs (36, 37) keep generating the urging forces urging the lid 20 in the opening direction while the lid 20 moves from the fully-closed position to the fully-opened position. Therefore, the springs (36, 37) allow keeping the fully-opened lid 20 from accidentally falling forward in the closing direction. In addition, the presence of the gears (16, 24, 31) permits inhibiting the lid 20, which is performing the opening operation, from abruptly or suddenly rising up because the gears (16, 24, 31) allows adjusting the urging forces that the springs (36, 37) exert.

Moreover, the present lid 1 according to Embodiment comprises the connector 35 including the base member 35 which is provided with the cover element 35*d* covering or accommodating the meshes between the gear 31 and the mating gears, specifically, the mesh between the gear 31 and the gear 16 and the mesh between the gear 31 and the gear 24. That is, the connector 30 not only includes the base member 35 but also the cover element 35*d* covering or accommodating the meshes between the gear 31 and the mating gears. Accordingly, the presence of the cover element 35*d* keeps dirt or dust from intruding into the meshes between the gear 31 and the mazing gears. Consequently, the cover element 35*d* makes possible inhibiting foreign matters from objecting or hindering the turning or swinging gears (16, 24, 31), namely, the opening and closing lid 20.

In addition, the present lid device 1 according to Embodiment comprises: not only the connector 30 including the base member 35 which is provided with the stopper element 39A controlling the lid 20 so as not to open more than a predetermined magnitude of opening; but also the opening former 10 including the supporter 15 which is provided with the contact element 15A capable of coming in contact with the stopper element 39A of the base member 35. Consequently, the presence of the stopper element 39A and contact element 15A makes possible controlling the lid 20 so as not to open more than a predetermined magnitude of opening.

Note that the major constituents of the present lid device 1 according to Embodiment, namely, the gear 16, the gear 24, the gear 31, the shaft 32, the shaft 33, the axial bores (17*a*, 18*a*), the axial bores (25*a*, 26*a*), the insertion bores (35*a*, 35*b*), and the springs (36, 37), and the stopper element 39A of the connector 30 and the contact element 15A of the opening former 10 are respectively equivalent to the claimed "first gear," the claimed "second gear," the claimed "third gear," the claimed "first shaft," the claimed "second shaft," the claimed "first axial bore," the claimed "second axial bore," the claimed "first insertion bore" and "second insertion bore," the claimed "urging member," and the claimed "stopper."

Incidentally, the above-described present lid device 1 according to Embodiment comprises the connector 30 including the three shafts (32, 33, 34), the opening former 10 provided with axial bores (17*a*, 18*a*) into which the shaft 32 is inserted, and the lid 20 provided with the axial bores (25*a*, 26*a*) into which the shaft 33 is inserted. However, the present invention is not limited to the thus constructed present lid device 1 at all. For example, the connector 30 satisfactorily includes the shaft 32 made integral with the opening former 10, and the connector 30 is adequately provided with the axial bores (17*a*, 18*a*) into which the shaft 32 is inserted. Similarly, the connector 30 satisfactorily includes the shaft 33 made integral with the opening former 10, and the connector 30 is adequately provided with the axial bores (25*a*, 26*a*) into which the shaft 33 is inserted.

Moreover, the above-described present lid device 1 according to Embodiment comprises the springs (36, 37) installed between the opening former 10 and the connector 30. However, the present invention is not limited to the thus constructed present lid device 1 at all. For example, the springs (36, 37) are also satisfactorily installed between the lid 20 and the connector 30; alternatively, they are even adequately installed between the opening former 10 and the lid 20. Additionally, the springs (36, 37) are also satisfactorily installed at any of two or more locations between the opening former 10 and the connector 30, between the lid 20 and the connector 30, and between the opening former 10 and the lid 20.

In addition, the above-described present lid device 1 according to Embodiment comprises the stopper controlling the lid 10 so as not to open more than a predetermined magnitude of opening. The stopper is made of not only the connector 30 including the base member 35 provided with the stopper element 39A but also the opening former 10 including the supporter 15 provided with the contact element 15A. However, the present invention is not limited to the thus constructed present lid device 1 at all. For example, such a stopper also satisfactorily involves not only the combination of the connector 30 including the base member 35 provided with the stopper element 39A and the opening former 10 including the supporter 15 provided with the contact element 15A, but also another combination of the base member 35 provided with a stopper element 39B as well as the lid 20 provided with a contact element 29B as shown in FIG. 7, in addition to or instead of the aforementioned combination. The thus constructed stopper also controls the lid 20 so as not to open more than a predetermined magnitude of opening by means of the stopper element 39B of the connector 30 and the contact element 29B of the lid 20 that come in contact with one another during the opening-direction turning or swinging of the lid 20. Moreover, still another stopper even adequately involves the opening former 10 including the supporter 15 provided with a stopper element as well as the lid 20 provided with a contact element. The still other stopper thus constructed also controls the lid 20 so as not to open more than a predetermined magnitude of opening by means of the stopper element of the opening former 10 and the contact element of the lid 20 that come in contact with one another during the opening-direction turning or swinging of the lid 20.

Moreover, the above-described present lid device 1 according to Embodiment comprises the opening former 10, lid 20 and connector 30 each of whose gears (16, 24, 31) is made of a spur gear formed in a shape of disk. However, the present invention is not limited to the thus constructed present lid device 1 at all. For example, the gears (16, 24, 31) are also satisfactorily made of a cylindrically-formed gear elongating axially, respectively; alternatively, they are even adequately made of a helical gear, respectively.

Having now fully described the present invention, it will be apparent to one of ordinary skill in the art that many changes and modifications can be made thereto without departing from the spirit or scope of the present invention as set forth herein including the appended claims.

What is claimed is:
1. A lid device comprising:
an opening former provided with an opening;
a lid opening and closing the opening in the opening former; and
a connector intervening between the opening former and the lid and connecting the opening former with the lid; wherein
the opening former includes a first gear, which is provided with a first arc face on which first external teeth are formed;
the lid includes a second gear, which is provided with a second arc face on which second external teeth are formed;
the connector includes a third gear, which is provided with a third arc face, on which third external teeth are formed and which meshes with the first gear and the second gear;
the opening former and connector turn relative to one another about an axial center of the first gear;
the lid and connector turn relative to one another about an axial center of the second gear;

the connector interlocks the opening former, which turns relative to the connector, and the lid, which turns relative to the connector, with one another.

2. The lid device according to claim 1 further comprising:
a base member, which is provided with the connector;
a first shaft, which is arranged coaxially with the axial center of the first gear and connects the opening former and the base member of the connector with one another; and
a second shaft, which is arranged coaxially with the axial center of the second gear and connects the lid and the base member of the connector with one another.

3. The lid device according to claim 2, wherein:
the opening former includes a first axial bore which opens coaxially with the axial center of the first gear and into which the first shaft is inserted; and
the lid includes a second axial bore which opens coaxially with the axial center of the second gear and into which the second shaft is inserted.

4. The lid device according to claim 2, wherein the base member of the connector includes a first axial bore into which the first shaft is inserted and a second axial bore into which the second shaft is inserted.

5. The lid device according to claim 1 further comprising an urging member, which is arranged between the opening former and the connector, or between the lid and the connector, and which generates an urging force for urging the lid in an opening direction thereof.

6. The lid device according to claim 1, wherein the connector further includes a cover member covering a mesh between the first gear and the third gear, or a mesh between the second gear and the third gear.

7. The lid device according to claim 1 further comprising a stopper controlling the lid so as not to open more than a predetermined magnitude of opening.

8. The lid device according to claim 1, wherein the first gear, the second gear, and the third gear sustain a predetermined positional relationship to each other when viewed axially, regardless of any positions at which the opening and closing lid are present.

9. The lid device according to claim 1, wherein:
the first external teeth of the first gear are formed partially on the first arc face;
the second external teeth of the second gear are formed partially on the second arc face; and
the third external teeth of the third gear are formed entirely on the third arc face.

10. The lid device according to claim 2 further comprising the base member including a third shaft arranged coaxially with the axial center of the third gear, wherein the first shaft, the second shaft and the third shaft sustain a predetermined positional relationship to each other when viewed axially, regardless of any positions at which the opening and closing lid are present.

* * * * *